(12) United States Patent
Choo et al.

(10) Patent No.: US 12,047,651 B2
(45) Date of Patent: Jul. 23, 2024

(54) SYSTEM AND METHOD OF SPONSORING STREAMER THROUGH DRAWING PICTURE

(71) Applicant: TOOTHLIFE CO., LTD., Gyeonggi-do (KR)

(72) Inventors: Yun Sung Choo, Gyeonggi-do (KR); Won Pyo Hong, Gyeonggi-do (KR); Joo Won Kim, Gyeonggi-do (KR)

(73) Assignee: TOOTHLIFE CO., LTD., Gyeonggi-do (KR)

( * ) Notice: Subject to any disclaimer, the term of this patent is extended or adjusted under 35 U.S.C. 154(b) by 28 days.

(21) Appl. No.: 17/940,562

(22) Filed: Sep. 8, 2022

(65) Prior Publication Data
US 2023/0209144 A1 Jun. 29, 2023

(30) Foreign Application Priority Data

Dec. 24, 2021 (KR) .......... 10-2021-0186939
Feb. 25, 2022 (KR) .......... 10-2022-0025019

(51) Int. Cl.
*H04N 21/478* (2011.01)
*G06T 11/00* (2006.01)
(Continued)

(52) U.S. Cl.
CPC .......... *H04N 21/478* (2013.01); *G06T 11/00* (2013.01); *H04L 12/1813* (2013.01); *H04N 21/2187* (2013.01)

(58) Field of Classification Search
CPC ...................................... G06Q 30/0207–0277
See application file for complete search history.

(56) References Cited

U.S. PATENT DOCUMENTS 11,924,262 B2 * 3/2024 Choo .............. H04L 65/75
2009/0262203 A1 * 10/2009 Hitaka ............ H04N 1/32106
348/E5.022
(Continued)

FOREIGN PATENT DOCUMENTS

JP 2019-515406 A 6/2019
JP 2020140515 A 9/2020
(Continued)

OTHER PUBLICATIONS

Johnson, Mark et al. "And Today's Top Donator Is: How Live Streamers on Twitch.tv Monetize and Gamify Their Broadcasts." Social Media + Society, Oct.-Dec. 2019, pp. 1-11. (Year: 2019).*
(Continued)

*Primary Examiner* — Luis A Brown
(74) *Attorney, Agent, or Firm* — TAROLLI, SUNDHEIM, COVELL & TUMMINO L.L.P.

(57) ABSTRACT

A system and method of sponsoring a streamer through drawing a picture is proposed. The system and method may set and provide an amount of ink available to a sponsor according to a sponsorship amount and output a picture directly drawn by the sponsor using the ink and a picture drawing process on a broadcast streaming screen for a predetermined period of time, so as to sponsor the streamer. In addition, in the embodiment, a picture quest sponsorship service in which a quest function and a picture sponsorship function are combined is provided.

6 Claims, 8 Drawing Sheets

(51) Int. Cl.
*H04L 12/18* (2006.01)
*H04N 21/2187* (2011.01)

(56) References Cited

U.S. PATENT DOCUMENTS

| | | | | |
|---|---|---|---|---|
| 2018/0109479 A1* | 4/2018 | Bahk | ................. | H04L 51/216 |
| 2018/0286084 A1* | 10/2018 | Park | ................. | G09G 3/2003 |
| 2021/0319480 A1* | 10/2021 | Hansen | ................. | G06F 3/0484 |
| 2021/0365218 A1* | 11/2021 | Sutherland | .......... | G06F 3/04842 |

FOREIGN PATENT DOCUMENTS

| | | | | |
|---|---|---|---|---|
| KR | 10-1423524 | | 7/2014 | |
| KR | 20210039064 A | | 4/2021 | |
| KR | 10-2268975 B | | 6/2021 | |
| KR | 10-2323488 | | 11/2021 | |
| WO | WO-2017188634 A1 * | | 11/2017 | ............. G06F 16/00 |

OTHER PUBLICATIONS

Decision to grant for corresponding Japanese Patent Application No. 2022-139432, dated Sep. 6, 2023, pgaes 1-5.
Decision to grant for corresponding Korean Patent Application No. 10-2022-0025019, dated Sep. 14, 2022, pp. 1-3.

* cited by examiner

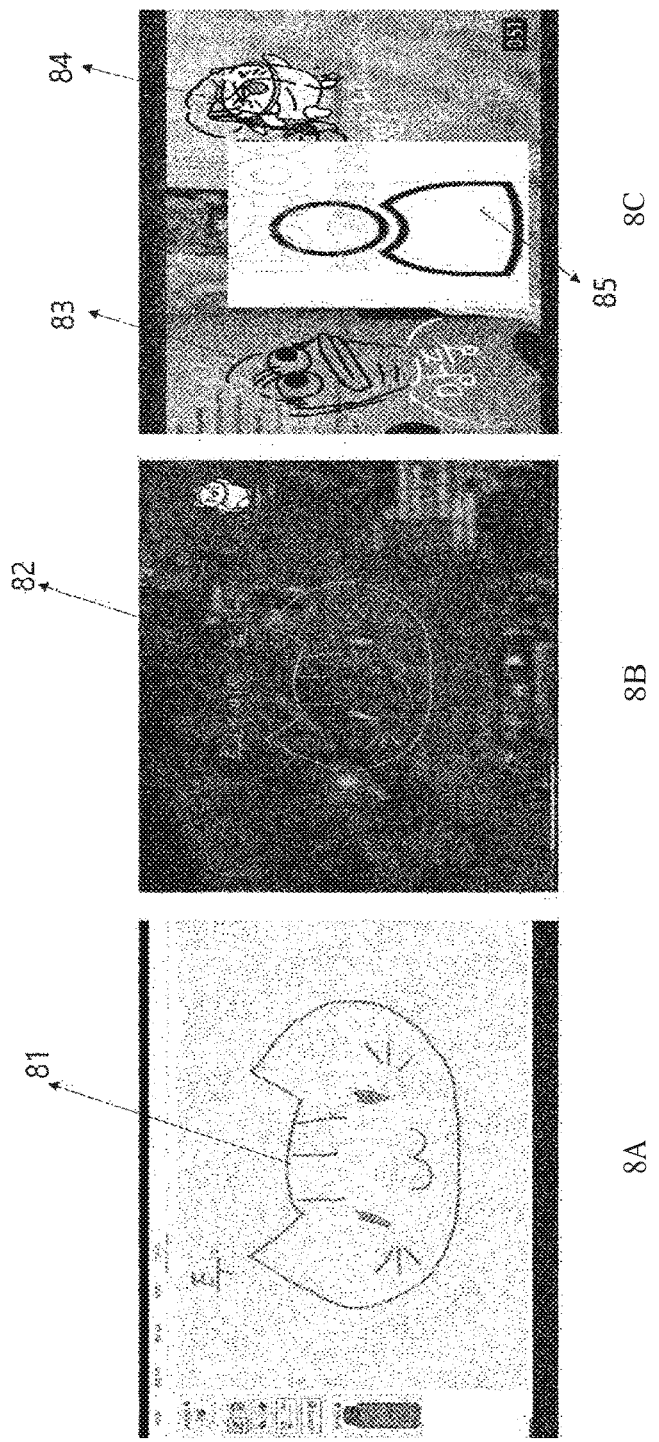

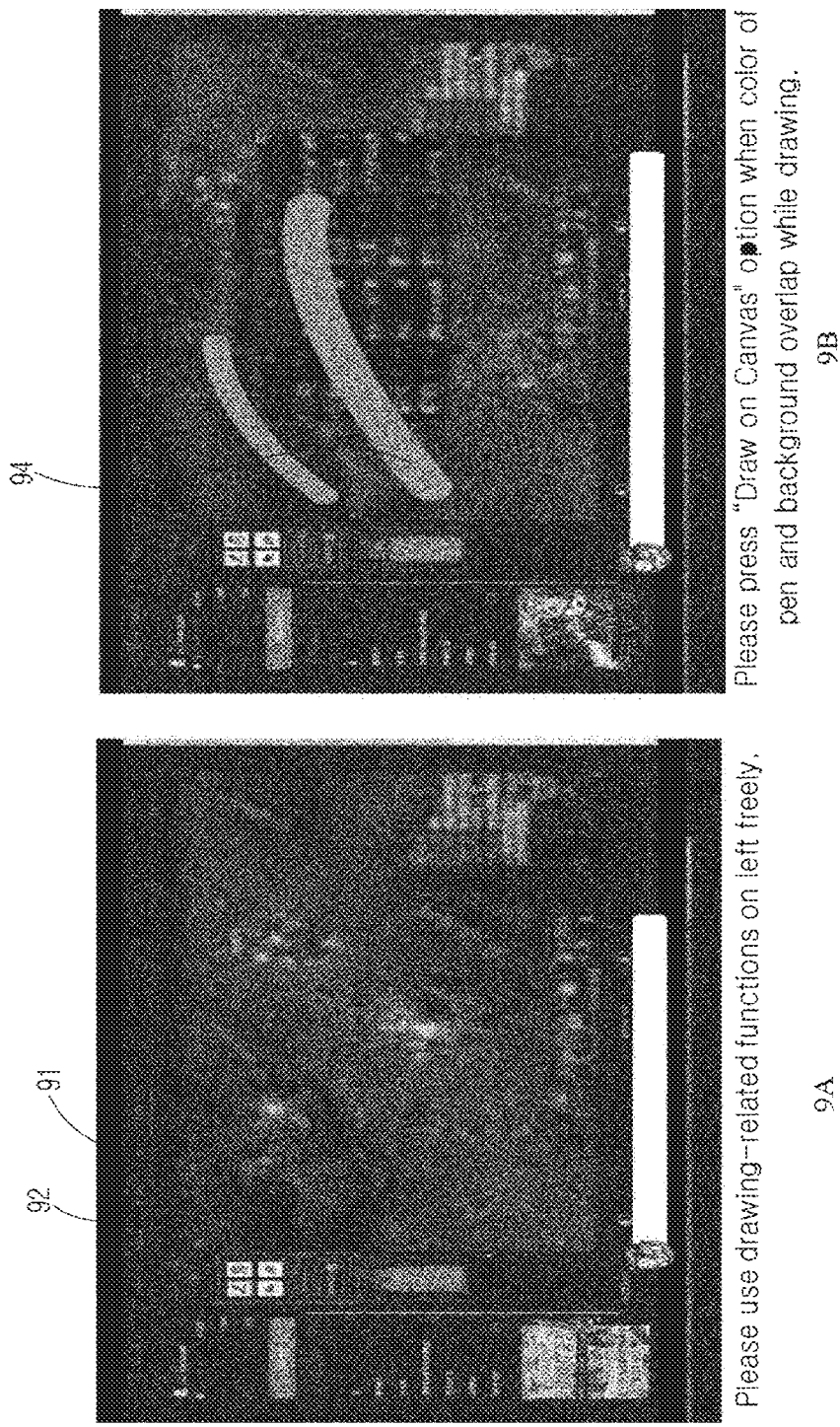

SYSTEM AND METHOD OF SPONSORING STREAMER THROUGH DRAWING PICTURE

CROSS REFERENCE TO RELATED APPLICATION

This application is based on and claims priority from Korean Patent Applications Nos. 10-2021-0186939 filed on Dec. 24, 2021 and 10-2022-0025019 filed on Feb. 25, 2022 in the Korean Intellectual Property Office, the disclosure of which is incorporated herein in its entirety by reference.

BACKGROUND OF THE INVENTION

Field of the Invention

The present disclosure relates to a system and method of sponsoring a streamer through drawing a picture and, more particularly, to a system and method of sponsoring a streamer and outputting a picture directly drawn by a sponsor using ink that is set according to a sponsorship amount on a streaming screen.

Description of the Related Art

Unless otherwise indicated in the present disclosure, the content described in this section is not related art to the claims of this application and is not admitted to be the related art by inclusion in this section.

The number of streamers who conduct personal broadcasts using domestic and foreign streaming platforms such as YouTube, Afreeca, and Twitch, and the number of viewers watching the personal broadcasts are increasing. As shown in FIG. 1, a conventional streaming platform provides a one-way service in which a subject who conducts a broadcast transmits broadcast screens in real time by using an input device such as a camera or a microphone, and viewers unilaterally receive and watch the broadcast screens.

Viewers may sponsor a streamer by setting a mission with the streamer who is streaming, and paying sponsorship money in return for success of the mission. When the viewers sponsor the streamer, an event screen that informs sponsorship as a kind of reward concept for the sponsorship may be transmitted together. However, a conventional streaming service simply provides a function to an extent where a viewer's ID and the sum of sponsorship amounts are overlaid on a screen.

DOCUMENTS OF RELATED ART

Patent Documents (Patent Document 1) Korean Patent No. 10-2323488 (registered on Nov. 2, 2021)
(Patent Document 2) Korean Patent No. 10-1423524 (registered on Jul. 21, 2014)

SUMMARY OF THE INVENTION

A system and method of sponsoring a streamer through drawing a picture according to an exemplary embodiment sets and provides an amount of ink available to a sponsor according to a sponsorship amount and outputs a picture directly drawn by the sponsor using the ink and a picture drawing process on a streaming screen for a predetermined period of time, so as to sponsor the streamer.

In addition, in the exemplary embodiment, a picture quest sponsorship service in which a quest function and a picture sponsorship function are combined is provided.

A system of sponsoring a streamer through drawing a picture according to the exemplary embodiment includes: a streamer terminal configured to generate and transmit streaming content to a streaming server; a sponsor terminal configured to set a picture sponsorship function in a widget, adds a browser to a streaming program, and generate the picture exposed on a streaming screen after channel linkage; and a picture sponsorship server is configured to receive the picture generated by a sponsor and output, on the streaming screen for a predetermined period of time, a process of drawing the picture on the streaming screen and a completed picture.

According to the exemplary embodiment, the picture sponsorship server may be configured to include: a storage module configured to store the picture drawing process and completed picture data, which are generated by the sponsor terminal; an editing module configured to edit a picture completion process video and a completed picture video so that the picture drawing process and the completed picture are output according to a set time; a picture sponsorship module configured to sponsor the streamer by outputting the edited picture completion process video and completed picture video for the predetermined period of time, a setting module configured to set an amount of ink required for drawing, the ink being provided to the sponsor, according to a sponsorship amount; a consumption control module configured to control the amount of ink consumed by the sponsor terminal; and a sponsorship amount calculation module configured to calculate the sponsorship amount according to the amount of ink consumed when a picture sponsorship event occurs, so as to sponsor the calculated sponsorship amount to the streamer.

The system of sponsoring the streamer through drawing the picture as described above provides a picture sponsorship system that may transmit a process in which a viewer is drawing a picture to a streamer's broadcast screen, whereby the fun of a sponsor may be increased and more sponsorship may be encouraged. In addition, active communication between the streamer and the sponsor may be encouraged.

In addition, the streamer selects an excellent picture and provides a reward to the sponsor who draws the excellent picture, whereby the sponsor may also generate profits through sponsoring the picture.

The effects of the present disclosure are not limited to the above effects, and should be understood to include all effects that can be inferred from the detailed description of the present disclosure or the configuration of the present disclosure described in the claims.

BRIEF DESCRIPTION OF THE DRAWINGS

FIGS. 8A to 8C are views illustrating use examples of the system of sponsoring the streamer through drawing the picture according to the exemplary embodiment.

FIGS. 9A and 9B are views illustrating functions of ink filling and ink consumption of the system of sponsoring the streamer through drawing the picture according to the exemplary embodiment.

DETAILED DESCRIPTION OF THE INVENTION

Figure 1:
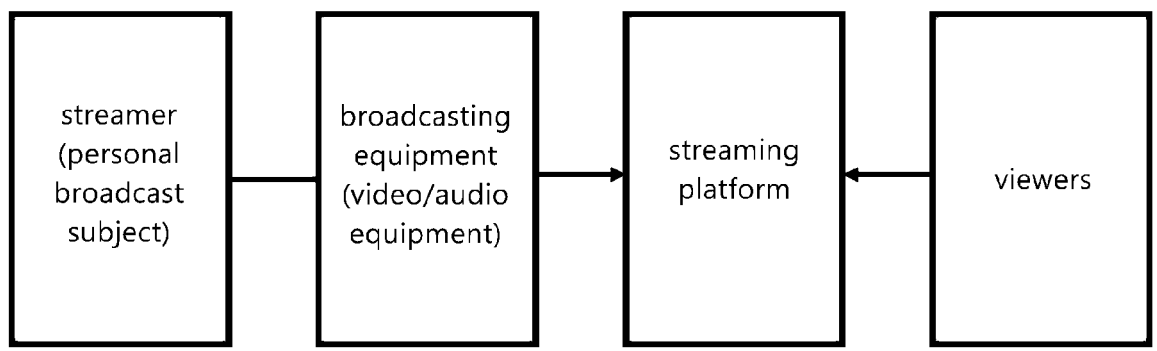
FIG. 1 is a view illustrating a conventional streaming platform.

Advantages and features of the present disclosure and the methods of achieving the same will become apparent with reference to exemplary embodiments described below in detail in conjunction with the accompanying drawings. However, the present disclosure is not limited to the exemplary embodiments disclosed below, but will be implemented in a variety of different forms. These exemplary embodiments are provided only to complete the disclosure of the present disclosure and to completely inform the scope of the present disclosure to those skilled in the art to which the present disclosure pertains, and the present disclosure is only defined by the scope of the claims. Like reference numerals generally denote like elements throughout the present disclosure.

In the following descriptions of the exemplary embodiments of the present disclosure, it is to be noted that when a detailed description of a known function or configuration may unnecessarily obscure the subject matter of the present disclosure, the detailed description thereof will be omitted. In addition, terms to be described later are terms defined in consideration of functions in the exemplary embodiments of the present disclosure, which may vary according to the intention or custom of users or operators. Therefore, definitions of these terms should be made on the basis of the content throughout the present specification.

Figure 2:
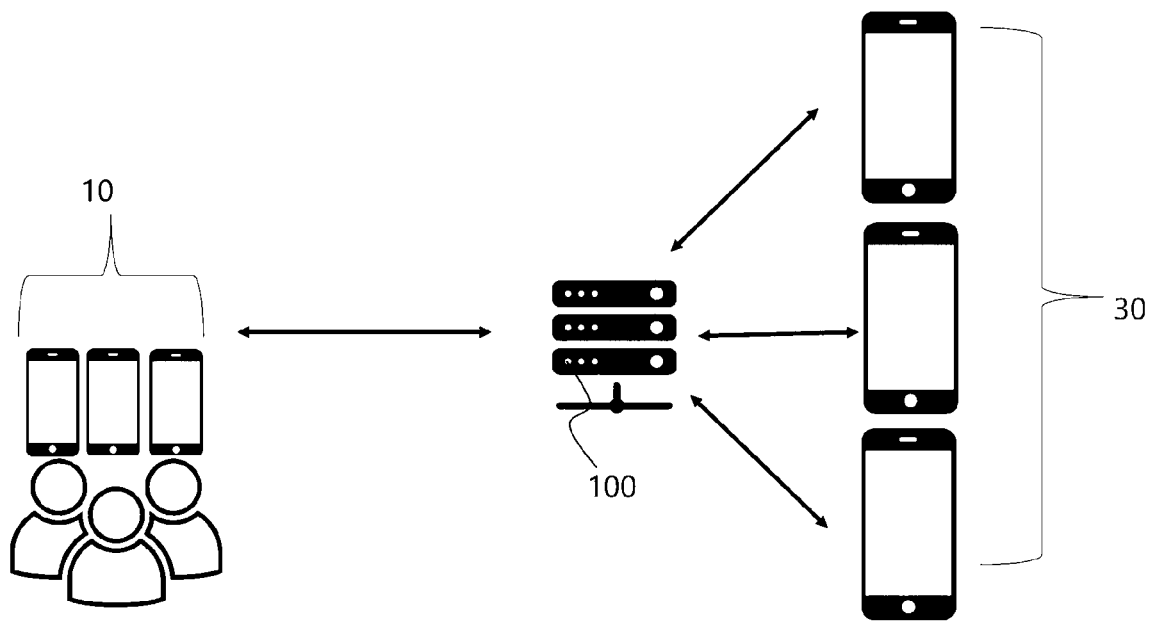
FIG. 2 is a view illustrating a configuration of a system of sponsoring a streamer through drawing a picture according to an exemplary embodiment.

FIG. 2 is a view illustrating a configuration of a system of sponsoring a streamer through drawing a picture according to an exemplary embodiment.

Referring to FIG. 2, the system of sponsoring the streamer through drawing the picture according to the exemplary embodiment may include a streamer terminal 10, a sponsor terminal 30, and a sponsorship server 100. The streamer terminal 10 generates streaming content and transmits the streaming content to a streaming server.

The sponsor terminal 30 sets a picture sponsorship function in a widget, adds a browser to a streaming program, and generates a picture exposed on a streaming screen after channel linkage.

The picture sponsorship server 100 receives the picture generated by a sponsor and outputs, on the streaming screen for a predetermined period of time, a process of drawing the picture on the streaming screen and a completed picture.

Figure 3:
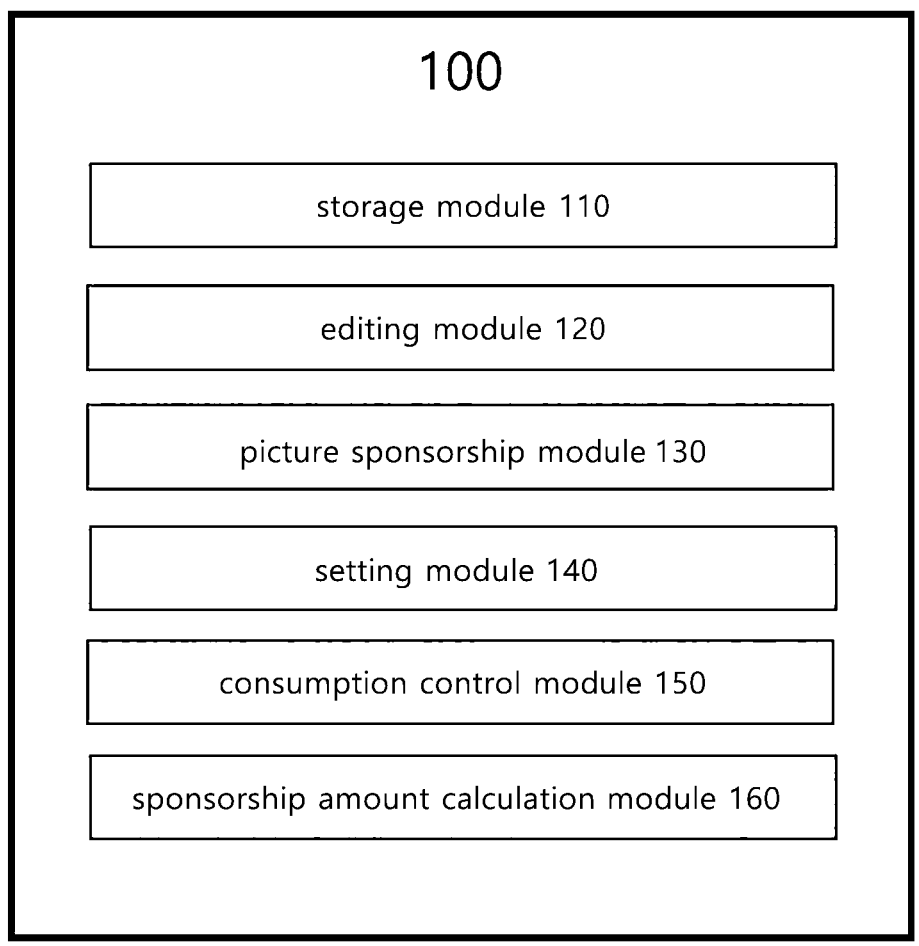
FIG. 3 is a view illustrating a configuration for data processing of a sponsorship server according to the exemplary embodiment.

FIG. 3 is a view illustrating a configuration for data processing of a sponsorship server according to the exemplary embodiment.

Referring to FIG. 3, the sponsorship server 100 according to the exemplary embodiment may be configured to include a storage module 110, an editing module 120, a picture sponsorship module 130, a setting module 140, a consumption control module 150, and a sponsorship amount calculation module 160. The term "module" used in this specification should be interpreted as being able to include software, hardware, or a combination thereof, depending on the context in which the term is used. For example, the software may be a machine language, a firmware, an embedded code, and an application software. As another example, the hardware may be a circuit, a processor, a computer, an integrated circuit, an integrated circuit core, a sensor, a Micro-Electro-Mechanical System (MEMS), a passive device, or a combination thereof.

The storage module 110 stores a picture drawing process and a completed picture for sponsorship, which are generated by a sponsor terminal. In the exemplary embodiment, the storage module 110 may store a picture that a sponsor is working on, and when ink provided to the sponsor remains, the storage module 110 may load the picture being worked on and confirm whether to proceed with additional work. That is, in the exemplary embodiment, in a case where the ink remains at a time when a picture is imported through a storing function for the picture being drawn, the corresponding picture may be allowed to be continuously drawn. In addition, through an import function, other streamers may also be sponsored by the picture drawn by the sponsor.

In addition, in the exemplary embodiment, RGB values of the picture are extracted by selecting a pipette from the picture being drawn by the sponsor through a pipette function, and the picture may be drawn with colors corresponding to the extracted RGB values. In addition, in the exemplary embodiment, a numerical value of a pen thickness may be directly input and designated by the sponsor.

The editing module 120 generates and edits a picture completion process video and a completed picture video so that a picture drawing process and a completed picture are output according to a preset time. In addition, in the exemplary embodiment, by selecting an invisible option of drawing rendering, only the final completed picture may be exposed on a streaming screen without outputting the picture completion process video.

The picture sponsorship module 130 sponsors a streamer by outputting an edited picture completion process video and a completed picture video. The picture sponsorship module 130 may also sponsor other streamers by loading a sponsorship picture stored by a sponsor through the import function.

The setting module 140 sets an amount of ink required for drawing, the ink being provided to a sponsor, according to a sponsorship amount. In the exemplary embodiment, the amount of ink provided is proportional to the sponsorship amount paid by the sponsor.

The consumption control module 150 controls the amount of ink consumed by a sponsor terminal.

The sponsorship amount calculation module 160 sponsors the calculated sponsorship amount to the streamer by calculating the sponsorship amount according to the amount of ink consumed in the picture completion process. In addition, the sponsorship amount calculation module 160 may sponsor the sponsorship amount, which is set in the completed picture by the sponsor, to the streamer when a sponsorship event occurs. In addition, the sponsorship amount set in a system may be sponsored when the sponsorship event occurs.

The picture sponsorship module 130 according to the exemplary embodiment may enable the streamer to select an excellent picture before a broadcast ends, and provide a reward to the sponsor who sponsors the selected excellent picture. The reward may include cash, points, ink, a privilege to attend an event provided by the streamer, and the like.

In addition, the picture sponsorship module 130 according to the exemplary embodiment provides a cash mind (catch mind) service combining a quest function and a picture sponsorship function. The quest function is a function that provides a reward or sponsorship when a streamer performs a mission during a broadcast. In the cash mind service according to the exemplary embodiment, when a sponsor selects a cash mind menu from a quest sponsorship menu, the sponsor draws a picture corresponding to a random word provided by a picture sponsorship server and transmits quest sponsorship to a streamer. After accepting the quest, the streamer guesses what the corresponding picture is within an image exposure time limit on a streamer's picture sponsorship widget. In the exemplary embodiment, similar to the quest sponsorship, after determining success or failure in the quest, the sponsor causes a correct answer of the corresponding picture to be output on the picture sponsorship widget. In the exemplary embodiment, it may be set such that the streamer may receive sponsorship only when the quest is successful.

Hereinafter, a method of sponsoring a streamer through drawing a picture will be described in sequence. Since operations (i.e., functions) of the method of sponsoring the streamer through drawing the picture according to the exemplary embodiment are essentially the same as functions of the system of sponsoring the streamer through drawing the picture, the description overlapping with FIGS. 2 and 3 will be omitted.

Figure 4:
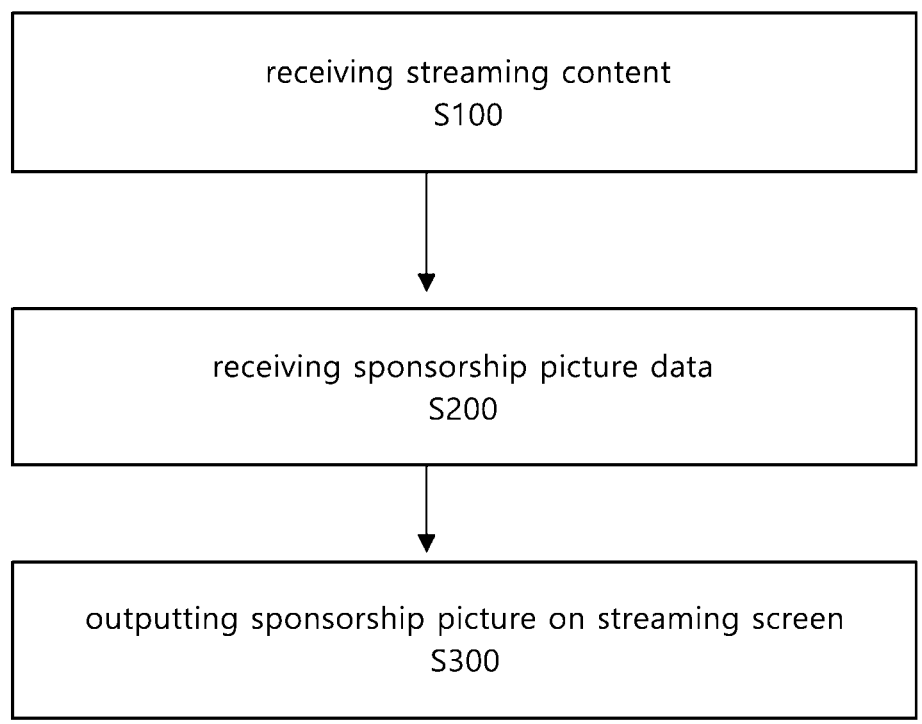
FIG. 4 is a view illustrating a data processing flow of the picture sponsorship server according to the exemplary embodiment.

FIG. 4 is a view illustrating a data processing flow of a picture sponsorship server according to the exemplary embodiment. Referring to FIG. 4, in step S100, a picture sponsorship server according to the exemplary embodiment receives streaming content generated from a streamer terminal, and in step S200, the picture sponsorship server sets a picture sponsorship function through a widget from a sponsor terminal, adds a browser to a streaming program, and receives picture generation data and completed picture data, which are exposed on a streaming screen after channel linkage.

In step S300, the sponsorship server receives the picture generated by a sponsor and outputs, on the streaming screen for a predetermined period of time, a process of drawing the picture on the streaming screen and a completed picture.

Figure 5:
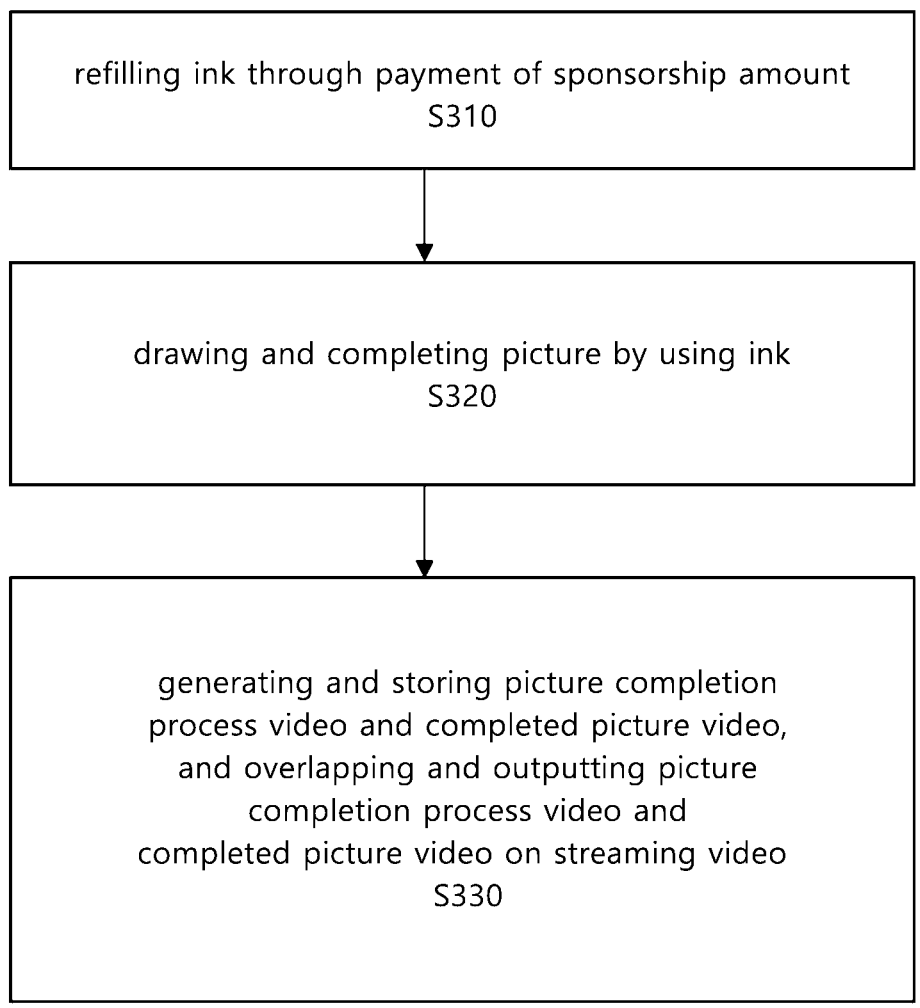
FIG. 5 is a view illustrating a data processing process for outputting a sponsorship picture by the sponsorship server according to the exemplary embodiment.

FIG. 5 is a view illustrating a data processing process for outputting a sponsorship picture by the sponsorship server according to the exemplary embodiment.

Referring to FIG. 5, in step S310, a sponsorship amount is paid by a sponsor terminal and ink corresponding to the paid sponsorship amount is provided to the sponsor terminal. In step S320, a picture is drawn and completed by using the ink in the sponsor terminal. In step S330, the picture sponsorship server generates and stores a picture completion process video and a completed picture video, and overlaps and outputs the picture completion process video and the completed picture video to a streaming video.

Figure 6:
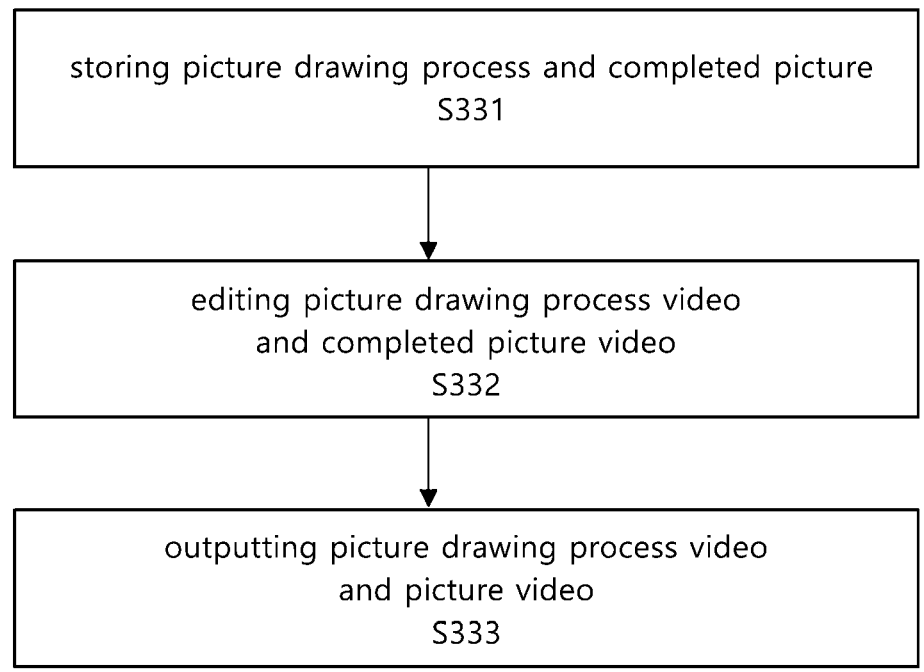
FIG. 6 is a view illustrating in more detail a data processing process of step S330 of generating and storing a picture completion process video and a completed picture video and overlapping and outputting the picture completion process video and the completed picture video to a streaming video, by the picture sponsorship server according to the exemplary embodiment.

FIG. 6 is a view illustrating in more detail a data processing process of step S330 of generating and storing the picture completion process video and the completed picture video and overlapping and outputting the picture completion process video and the completed picture video to the streaming video, by the picture sponsorship server according to the exemplary embodiment.

Referring to FIG. 6, in step S331, an image storage module stores a picture drawing process and a completed picture, which are generated by the sponsor terminal. In step S332, the picture drawing process video and the completed picture video are edited by an editing module so that the picture drawing process and the completed picture are output according to a preset time. In step S333, a picture sponsorship module sponsors the streamer by outputting the edited picture drawing process video and completed picture video.

Figure 7:
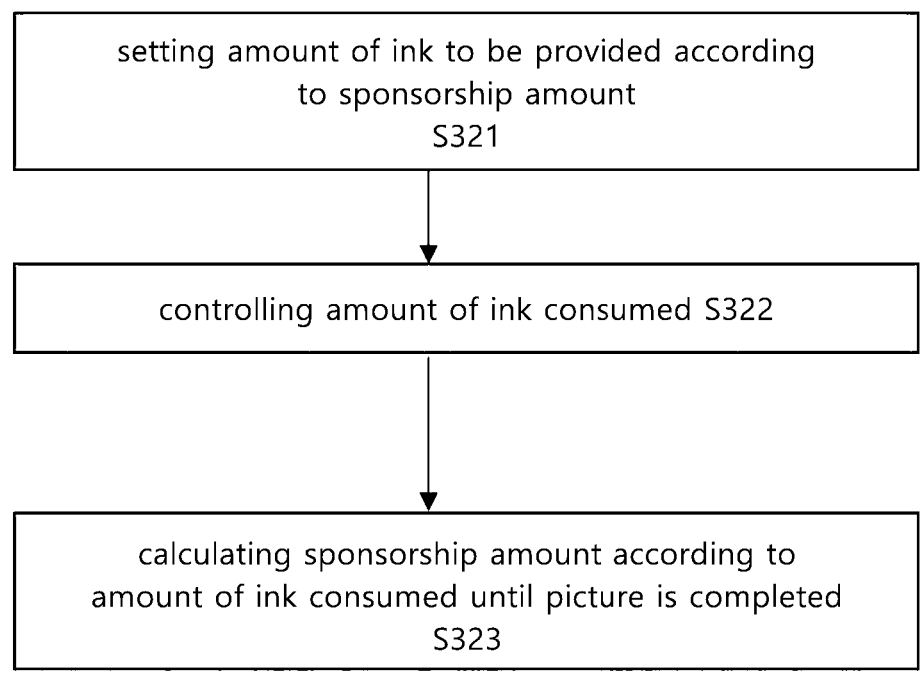
FIG. 7 is a view illustrating in more detail a data processing process of step S320 of drawing and completing the picture by using ink according to the exemplary embodiment.

FIG. 7 is a view illustrating in more detail a data processing process of step S320 of drawing and completing the picture by using the ink according to the exemplary embodiment.

Referring to FIG. 7, in step S321, a setting module sets an amount of ink required for drawing, the ink being provided to a sponsor, according to a sponsorship amount, and in step S322, the amount of ink consumed during the drawing is controlled. In step S323, a sponsorship amount calculation module calculates the sponsorship amount according to the amount of ink consumed when a picture is sponsored, so as to sponsor the calculated sponsorship amount to the streamer after the sponsorship picture is output.

FIGS. 8A to 8C are views illustrating use examples of the system of sponsoring the streamer through drawing the picture according to the exemplary embodiment.

Referring to FIGS. 8A to 8C, the system of sponsoring the streamer through drawing the picture according to the exemplary embodiment provides a paint interface, and a sponsor makes a sketch 81 of an image to be transmitted to a streamer through the paint interface, and stores the sketch 81. The sponsor starts the sketch by clicking a start icon before starting the sketch, and clicks an end icon when a sponsorship picture is completed. In the exemplary embodiment, when the start icon is clicked, recording of a sketch process may be started, and when the end icon is clicked, the recording may be ended.

In the exemplary embodiment, the recorded picture completion process video and completed picture video are edited to be output for a set time, so that as shown in FIG. 8B, the picture completion process video and the completed picture video 82 are overlapped and output on a streaming screen. In the exemplary embodiment, the picture completion process video may be output for three seconds, and the completed picture may be output for five seconds.

In addition, as shown in FIG. 8C, in the exemplary embodiment, by arranging and outputting the completed pictures 83 and 84 around a streamer 85 of a broadcast screen, the sponsor may sponsor the streamer and provide an opportunity for active communication between the streamer and the sponsor.

FIGS. 9A and 9B are views illustrating functions of ink filling and ink consumption of the system of sponsoring the streamer through drawing the picture according to the exemplary embodiment.

Referring to FIG. 9A, in the exemplary embodiment, ink 91 is filled by an amount proportional to a sponsorship amount paid by a sponsor. After the ink is filled, in the exemplary embodiment, the sponsor may draw a picture to sponsor a streamer by using the ink filled through a drawing-related function.

In addition, in the exemplary embodiment, the sponsor may purchase a line effect function including inks of different colors, brush pens, dotted lines, erasers, sprays, and the like through the sponsorship amount, so as to draw the picture and sponsor the streamer. Referring to FIG. 9B, in the exemplary embodiment, the amount of ink consumption varies according thicknesses of lines used in the picture drawing process. In the exemplary embodiment, even when the same length is sketched, the thicker the line to be sketched, the greater the ink consumption is.

The system of sponsoring the streamer through drawing the picture as described above provides the picture sponsorship system that may transmit the process in which a viewer is drawing a picture to a streamer's broadcast screen, whereby the fun of the sponsor may be increased and more sponsorship may be encouraged. In addition, active communication between the streamers and the sponsor may be encouraged.

In addition, the streamer selects an excellent picture and provides a reward to the sponsor who draws the excellent picture, whereby the sponsor may also generate profits through sponsoring the picture.

The disclosed subject matter is only an example, and without departing from the gist of the claims claimed in the claims, various modifications may be made by those skilled in the art, so the scope of protection of the disclosed subject matter is not limited to the specific exemplary embodiment described above in detail.

What is claimed is:

1. A system of sponsoring a streamer through drawing a picture, the system comprising:
    a streamer terminal configured to generate and transmit streaming content to a streaming server;
    a sponsor terminal configured to set a picture sponsorship function in a widget, adds a browser to a streaming program, and generate the picture exposed on a streaming screen after channel linkage; and
    a picture sponsorship server is configured to receive the picture generated by a sponsor and output, on the streaming screen for a predetermined period of time, a process of drawing the picture on the streaming screen and a completed picture,
    wherein the picture sponsorship server comprises:
    a storage module configured to store the picture drawing process and completed picture data, which are generated by the sponsor terminal;
    an editing module configured to edit a picture completion process video and a completed picture video so that the picture drawing process and the completed picture are output according to a set time; and
    a picture sponsorship module configured to sponsor the streamer by outputting the edited picture completion process video and completed picture video for the predetermined period of time,
    wherein the picture sponsorship server further comprises:
        a setting module configured to set an amount of ink required for drawing, the ink being provided to the sponsor, according to a sponsorship amount;
        a consumption control module configured to control the amount of ink consumed by the sponsor terminal; and
        a sponsorship amount calculation module configured to calculate the sponsorship amount according to the amount of ink consumed when a picture sponsorship event occurs, so as to sponsor the calculated sponsorship amount to the streamer.

2. The system of claim 1, wherein the storage module stores a working in progress picture and confirms whether to proceed with additional work by loading the working in progress picture when ink provided to the sponsor remains.

3. The system of claim 1, wherein the picture sponsorship module also sponsors other streamers by loading the picture stored by the sponsor through an import function.

4. A method of sponsoring a streamer through drawing a picture, the method comprising:
    (A) generating streaming content and transmitting the streaming content to a streaming server, by a streamer terminal;
    (B) setting a picture sponsorship function through a widget, adding a browser to a streaming program, and generating the picture exposed on a streaming screen after channel linkage, by a sponsor terminal; and
    (C) receiving the picture generated by a sponsor and outputting, on the streaming screen for a predetermined period of time, a process of drawing the picture on the streaming screen and a completed picture, by a picture sponsorship server,
    wherein step (C) further comprises:
    (C-1) paying a sponsorship amount and receiving ink corresponding to the paid sponsorship amount, by the sponsor terminal;
    (C-2) drawing and completing the picture by using the ink, by the sponsor terminal; and
    (C-3) generating and storing a picture completion process video and a completed picture video, and overlapping and outputting the picture completion process video and the completed picture video on the streaming video, by the picture sponsorship server,
    wherein step (C-3) further comprises:
    storing, by a storage module, a picture drawing process and the completed picture, which are generated by the sponsor terminal;
    editing, by an editing module, a picture drawing process video and the completed picture video so that the picture drawing process and the completed picture are output according to a preset time; and
    sponsoring, by a picture sponsorship module, the streamer by outputting the edited picture drawing process video and the completed picture video.

5. The method of claim 4, wherein step (C-2) comprises:
    setting, by a setting module, the amount of the ink required for drawing, the ink being provided to the sponsor, according to the sponsorship amount;
    controlling, by a consumption control module, the amount of the ink consumed by the sponsor terminal; and
    calculating, by a sponsorship amount calculation module, the sponsorship amount according to the amount of the ink consumed, so as to sponsor the calculated sponsorship amount to the streamer after the picture is output.

6. The method of claim 4, wherein, in the storing, by the storage module, of the picture drawing process and the completed picture, which are generated by the sponsor terminal, a working in progress picture is stored, the working in progress picture is loaded, and when the ink provided to the sponsor remains, whether to proceed with additional work is confirmed.

* * * * *